United States Patent [19]

Iida et al.

[11] 4,294,394
[45] Oct. 13, 1981

[54] METHOD OF AND APPARATUS FOR CONTINUOUSLY ROLLING STEEL SLABS

[75] Inventors: Yoshihiko Iida; Toshiyuki Kajiwara, both of Hitachi, Japan

[73] Assignee: Hitachi, Ltd., Tokyo, Japan

[21] Appl. No.: 63,776

[22] Filed: Aug. 6, 1979

[30] Foreign Application Priority Data

Aug. 7, 1978 [JP] Japan .................................. 53-95479

[51] Int. Cl.³ .......................... B23K 37/04; B21B 1/04
[52] U.S. Cl. .................................. 228/158; 29/527.7; 228/5.7; 228/26; 228/160
[58] Field of Search ................ 228/158, 26, 160, 4.1, 228/5.1, 5.7, 6 R; 29/527.7; 219/56, 57, 58, 137 R; 72/234

[56] References Cited

U.S. PATENT DOCUMENTS 2,868,954  1/1959  Skinner et al. ............. 219/137 R X
4,143,801  3/1979  Sargent .

FOREIGN PATENT DOCUMENTS 1089713  9/1960  Fed. Rep. of Germany ...... 228/158
51-112459  10/1976  Japan .
53-135863  11/1978  Japan .

OTHER PUBLICATIONS

Synopsis of 93rd Symposium of Steel Association of Japan, vol. 63, No. 4, 1977, p. 5181.

*Primary Examiner*—Paul A. Bell
*Assistant Examiner*—K. J. Ramsey
*Attorney, Agent, or Firm*—Thomas E. Beall, Jr.

[57] ABSTRACT

A method of and apparatus for continuously hot rolling steel slabs. Separate pieces of steel slabs are continuously fed from a slab yard and delivered to a carriage which is adapted to move reciprocatingly along the line of path of the steel slab pieces. The carriage carries a welder which can move transversely of the path of the slab pieces, and also clamp devices for clamping preceding and succeeding slabs to fix them to the carriage, as means for keeping the preceding and succeeding slab pieces in abutting condition. As a steel strip including a plurality of slab pieces welded together is moved at a predetermined rolling speed into a rolling mill, the carriage moves substantially at the same speed to keep the succeeding slab in abutment with the trailing end of the last slab piece of the steel strip, to permit the welder to weld these slab pieces at their abutting end. This welding is performed only over a part of the cross-sectional area of these slab pieces. The steel slabs are thus welded together into continuous form, delivered to the rolling mill and rolled by the latter. This system ensures a higher yield of products and permits a full continuous hot rolling of the steel slabs.

13 Claims, 24 Drawing Figures

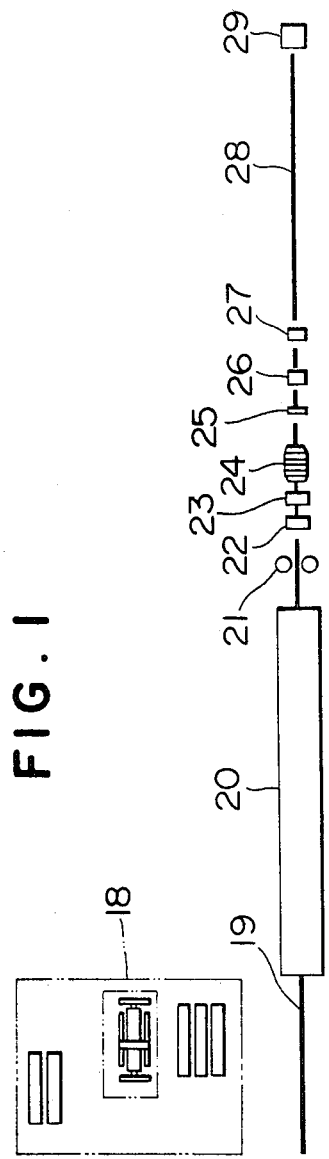
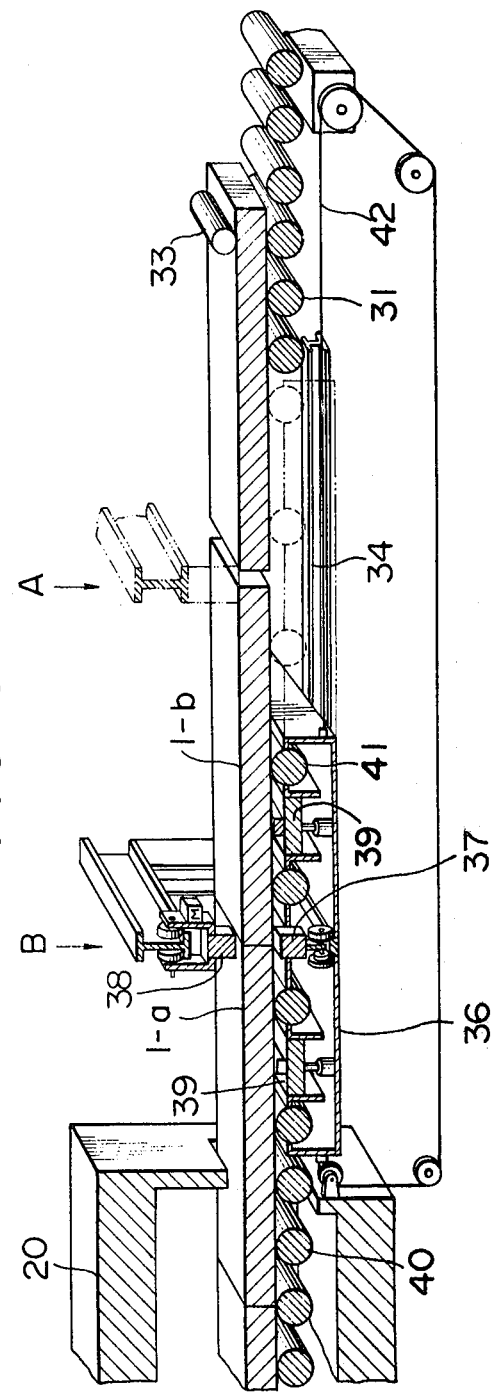

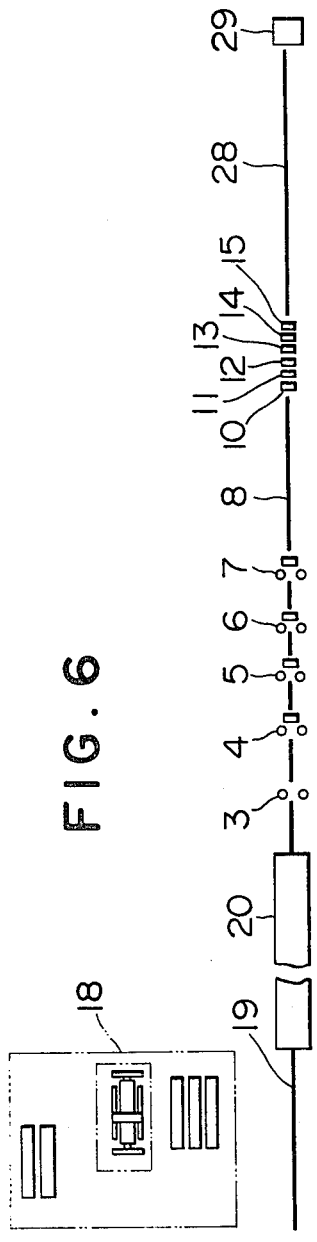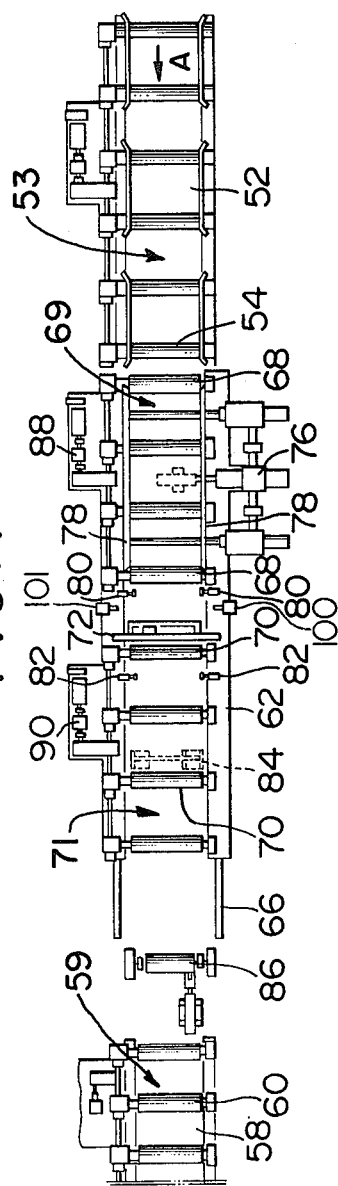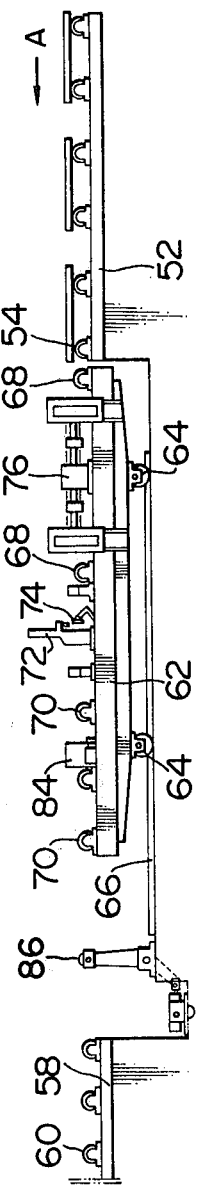

METHOD OF AND APPARATUS FOR CONTINUOUSLY ROLLING STEEL SLABS

BACKGROUND OF THE INVENTION

The present invention relates to a method of and apparatus for rolling, by means of a full continuous hot strip mill or a planetary mill, a steel slab extracted from a heating furnace. In this specification, this steel slab will be referred to simply as "slab", hereinafter.

In the conventional hot strip mill, as well as in the planetary mill, the length of the slab is limited from 6 to 13 m, due to the size of the furnace and for the convenience sake in transportation and handling.

As a result of rolling of this slab by a hot strip mill, a so-called "fish tail" is formed at the trailing end of the slab after the coarse rolling. Therefore, usually, it is necessary to shear the leading and trailing ends of the slab by means of a crop shear disposed at the upstream side of the finishing rolling mill, before the finish rolling. The "fish tail" is also observed in the strip after a rolling by a planetary mill. The "fish tail" inconveniently causes a reduction in the yield of the material.

In the hot strip mill, when a succeeding slab is introduced into the finishing rolling mill after the preceding slab has passed the finishing rolling mill, the strip is inconveniently floated by the force of air as it passes the hot runner table, if the speed of the strip is high. It is, therefore, necessary to reduce the rolling speed down to the level of 60% of ordinary maximum rolling speed, in this transient period. The ordinary maximum rolling speed may be recovered only after the leading end of the new strip has reached a down coiler to permit the application of tension to the strip.

In case of the planetary strip mill, a small gap exists between the preceding and succeeding slabs, although the slabs are fed continuously. Therefore, as this gap passes the rolling mill, vibration and noise which is 1.5 to 2.0 times as high as those in the ordinary rolling are generated to shorten the life of the machine parts of the mill. In some cases, the slabs are ejected from the planetary mill with their trailing ends unrolled and still having a large thickness. If this slab having a large thickness is introduced into the subsequent finishing or planishing mill, an extraordinarily high rolling load will be caused in the latter. To avoid this, conventionally, it has been necessary to quickly open the rolls of the planishing mill by means of hydraulic cylinders, when the thick trailing end of the slab passes the planishing mill. This also results in a reduction of yield, because of the off-gauge of the thickness immediately before and after the trailing end of the slab having large thickness.

To sum up, the conventional rolling techniques involve the following problems.

(1) Fish tails are formed in the end of the rolled slab, due to the presence of free or unrestrained leading and trailing ends of the slab during rolling.

(2) In the hot strip mill, while the leading end of a slab is positioned between the finishing mill and the down coiler and, hence, unrestricted, the slab will be inconveniently floated by air if the rolling speed is high. Therefore, it is necessary that the rolling has to be made at a reduced speed until the leading end is caught by the down coiler.

(3) In the planetary mill, the rolling is rendered unstable at the gap between the preceding and succeeding slabs, to cause a vibration and noise.

In the field of rod rolling, although not directly related to the rolling of slabs, a method called "endless rolling" has been proposed and actually used. This method is to continuously roll the rod materials which have been welded previously in series, into continuous rod material. Typical examples of this method are disclosed in the Synopsis of 93rd symposium of Steel Association of Japan, held on 4th to 6th April, 1977 (Vol. 63, No. 4, 1977), and also in Japanese Patent Laid-open No. 135863/1978. In these known techniques, successive materials are welded over the entire areas of their abutting surfaces.

This known endless rolling method does not suggest at all the continuous rolling of slabs of the invention, because the application of welding of successive rod materials over the entire abutting surfaces to the rolling of slabs is quite inappropriate and disadvantageous in view of the rolling speed and the feeding speed of slabs, particularly in relation to the capacity of the welder.

Meanwhile, Japanese Patent Laid-open Publication No. 112459/76 discloses an endless rolling method in which the slabs are superposed and welded at their opposing ends. The length of the overlap of the slabs is a half or more of the slab width. It is considered that this endless welding of slabs will affect the rolls of the rolling mill more adversely than the existing rolling method, although it may be effective in eliminating the formation of the fish tail. Also, this continuous rolling of slabs can provide only a small yield of the product and, therefore, has only little practical utility as a method of continuous rolling of slabs.

SUMMARY OF THE INVENTION

It is therefore a major object of the invention to provide a method of and apparatus for continuously rolling slabs which can ensure a good yield and productivity, thereby to overcome the above-described problems of the prior arts.

To this end, according to the invention, the preceding slab and the succeeding slab which are conveyed successively into the heating furnace or slab yard are connected in series by welding at portions of their abutting surfaces, i.e. not over the entire area of the abutting surface, on thier way to the rolling mill so as to be rolled continuously by the latter. Preferably, the welding of successive slabs are made only at the surface area of these slabs, more preferably to a depth which is large enough to provide a sufficient strength which will resist to the breakage or separation of the slabs during the rolling.

Thanks to the above stated feature, the invention remarkably improves the yield of products, as well as characteristic of passage of the slabs, over the conventional rolling method in which the successive slabs are not connected and even in comparison with the aforementioned known endless slab rolling method.

The above and other objects, as well as advantageous features of the invention will become more clear from the following description of the preferred embodiments taken in conjunction with the accompanying drawings.

BRIEF DESCRIPTION OF THE DRAWINGS

FIG. 1 shows the whole part of a rolling equipment including a planetary mill to which the method of the invention is applied;

FIG. 3 is a side elevational view of an on-line welder;

FIG. 6 shows the whole part of a continuous hot strip rolling equipment;

FIG. 7 is a plan view of the whole part of a continuous welding apparatus as used in the method of the invention;

FIG. 8 is a side elevational view of the apparatus shown in FIG. 7;

DESCRIPTION OF THE PREFERRED EMBODIMENTS

Figure 2:
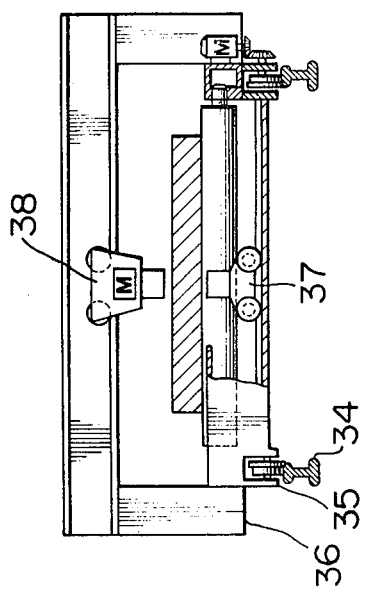
FIG. 2 is a detailed illustration of the furnace inlet side of the rolling equipment as shown in FIG. 1.

Hereinafter, a description will be made as to a planetary mill to which the present invention is applied.

FIG. 1 shows a rolling line having a planetary mill 24. Slabs discharged from a slab yard 18 are welded in series as they passes a front table 19 and are reheated in a tunnel furnace 20. The continuous slabs are then made to pass through an edger 21, Nos. 1 and 2 feed rollers 22, 23 and are finally rolled by the planetary mill 24 into a continuous bar which is delivered through a looper 25 and a planishing mill 26 to a dividing shear 27 which is adapted to shear the connecting portion of the bar. Finally, the bars are transferred on a hot run Table 28 and are coiled by means of a coiler 29.

FIG. 2 shows the detail of the slab yard 18. The slabs 1 produced by a continuous casting machine or a slabbing mill are delivered to the slab yard 18 for a surface treatment such as removal of flaws which is effected by a surface treating device 30. The slabs 1 thus treated are then delivered to a rolling path line on a table 19 in front of the tunnel furnace. An on-line welder 32 is mounted on the front table 19. This on-line welder 32 is adapted to weld each preceding slab 1-a to each succeeding slab 1-b as the slabs are moved toward the furnace. To this end, the on-line welder 32 is adapted to move in the direction of the path line in synchronization with the movement of the slabs.

Figure 4:
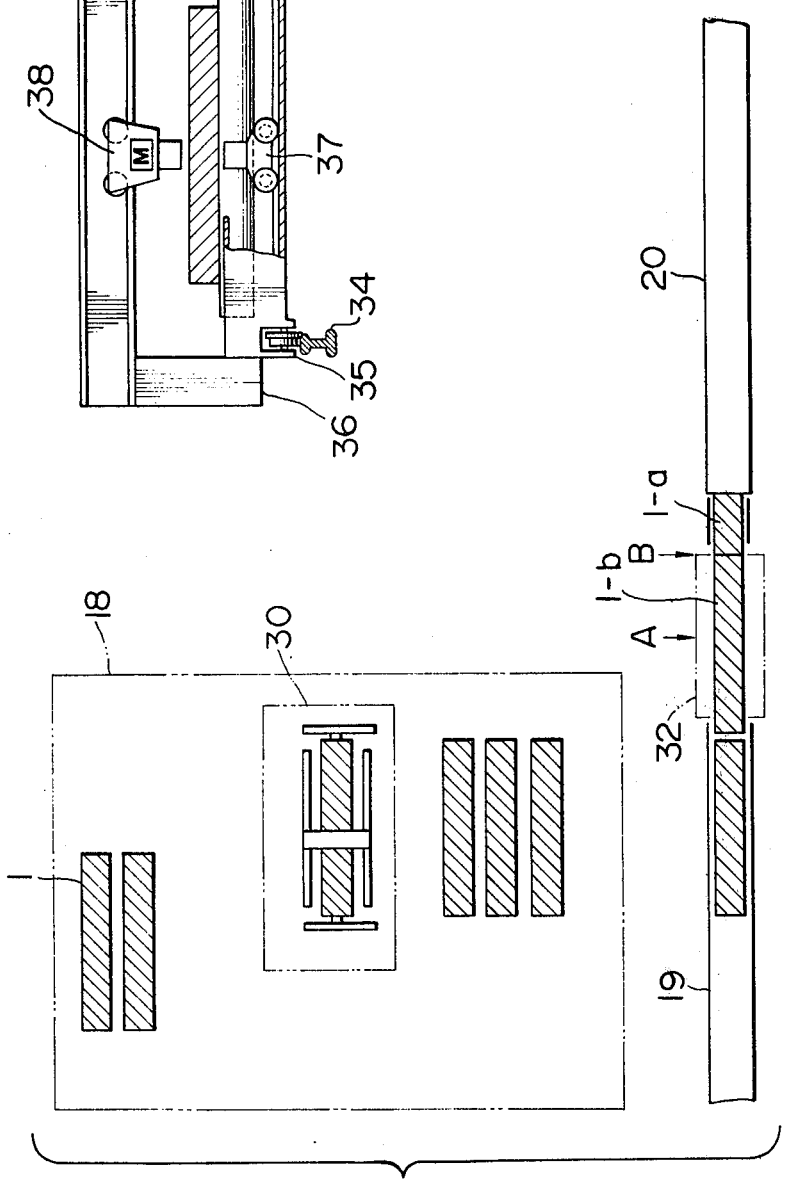
FIG. 4 is a front elevational view of an on-line welder shown in FIG. 2.

FIGS. 3 and 4 show the detail of the on-line welder. A longitudinally movable carriage 36 is adapted to catch and hold the preceding slab 1-a and the succeeding slab 1-b by means of the pressing rollers 33 at position A, and to fix these slabs by means of slab fixing devices 39, respectively, which fixing devices which may be solenoid actuated.

Then, the upper and lower surface portions of the slabs 1-a and 1-b are welded along the abutting line, i.e. in the breadthwise direction of the slabs. During this welding, the slabs 1-a, 1-b and the carriage 36 are moved longitudinally in synchronization with the slabs 1, by means of the slab fixing device 39. During such longitudinal movement of the carriage 36, upper and lower welders are moved transversely of the carriage 36 along the abutting edges of the slabs 1-a, 1-b by respective motors M. Rolls 31 support the slabs upstream of the carriage 36; rolls 41 support the slabs on the carriage 36; and rolls 40 support the slabs in the reheat tunnel furnace 20.

Then, as the welding is completed at position B, the 1-a, 1-b are released from the slab fixing devices 39 and are thereby separated from the carriage 36. Subsequently, the carriage 36 is returned to the position A, by means of a rope winding device which is adapted to pull and wind a rope 42 for towing the carriage. The successive preceding slab 1-a and succeeding slab 1-b are welded in the described manner by a repetition of the above stated process.

More specifically, the welding is made in a manner described below. The slabs are moved in the tunnel furnace 20 at a speed of about 1.5 to 2.0 m/min. Assuming here that the speed is 2.0 m/min. and that the slab 1 has a length of 6 m, it is necessary that the whole welding process is completed in 3 minutes. An example of the welding process is shown in Table 1 below.

TABLE 1

|   | STEPS | TIME |
|---|-------|------|
| 1 | slab holding | 5 sec |
| 2 | welding | 120 sec |
| 3 | slab release | 5 sec |
| 4 | quick return | 40 sec |
| 5 | margin | 10 sec |
|   | Total | 180 sec |

Usually, the slab has a thickness of 150 mm and a width of 1500 mm. In order to completely weld this cross-section within 120 seconds as shown in Table 1, it is necessary to employ a high-speed welder. To cope with this demand for the high-speed welding, it is possible to use electron beam welding. As an alternative, it is possible to use resistance flash butt welding which is used recently in continuous billet rolling mill, but this method requires an impractically large capacity of the power supply.

However, it is not necessary to weld the slabs over their entire cross-sectional area, for the reason stated hereinunder.

In the rolling equipment having a planetary mill, the slabs 1 are forcibly introduced into the planetary mill 24 by means of feed rolls 22, 23. Therefore, the slabs 1 are subjected only to compression force when they are at the inlet side of the planetary mill 24. On the other hand, at the position between the planetary mill 24 and the mill 26, there is located a looper 25 for controlling the tension thereby to prevent the drawing, so that a tension is applied to the strip when the latter is positioned between the planetary mill 24 and the planishing mill 26. The level of the unit tension (tension per unit area of strip) $\sigma U$ is about 0.5 Kg/mm$^2$. A tension of a level substantially equal to the level of this unit tension acts on the strip stretched between the planishing mill 26 and the coiler 29.

The weld joint has only to withstand these tensions. In other words, only a welding strength capable of withstanding these stress is required.

Figure 5A:
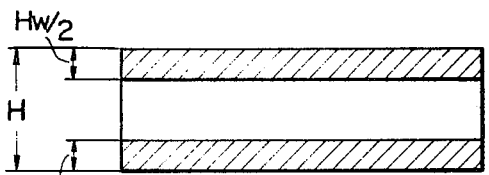
FIGS. 5A to 5I are cross-sectional views of the welded portion of connected slabs.
Figure 5B:
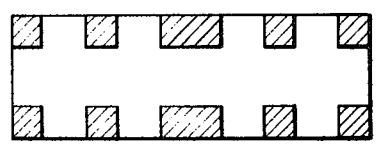
Figure 5C:
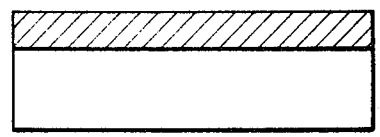
Figure 5D:
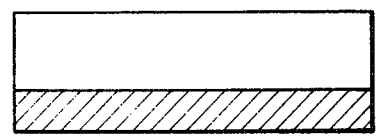
Figure 5E:
Figure 5F:
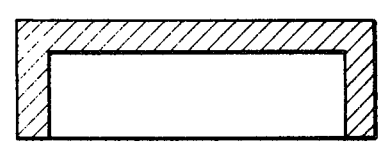
Figure 5G:
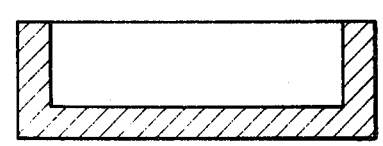
Figure 5H:
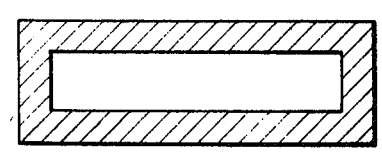
Figure 5I:
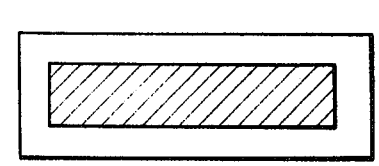

The thickness of the strip after the rolling by the planetary mill 24 is about 5 mm. The ratio of the welded thickness to the non-welded thickness of the slab is usually maintained almost constant before and after a rolling, because the thicknesswise distribution of the elongation is constant. It is assumed here that the slab 1 initially has a thickness H of 150 mm and that the welding is effected over 1/10 of the thickness, i.e. Hw=15 mm, as shown in FIG. 5A. Therefore, when the thickness of the slab has been reduced to h=5 mm, the welded thickness is also reduced to hw=0.5 mm. If the unit tension $\sigma U$ is 0.5 Kg/mm$^2$, the tensile stress $\sigma T$ acting in the welded region is given as follows;

$$\sigma T = \sigma U \cdot \frac{h}{hw}$$
$$= 0.5 \times \frac{5}{0.5}$$
$$= 5 \text{ Kg/mm}^2$$

The temperature of the strip in this state is 1000° C. or so, and the yield stress is about 6 Kg/mm$^2$ in case of iron and about 10 Kg/mm$^2$ in case of stainless steel. Therefore, no local elongation due to the yielding of the welded part takes place.

It will be apparent from the above explanation that it is not necessary to effect the welding over the entire cross-sectional areas of abutting surfaces of the slabs. In fact a welding which covers 1/20 to ½ of the whole cross-sectional area of the slab can provide a sufficient strength.

FIGS. 5B to 5I show various other patterns of welding. In each case, the welding is effected only on parts of the cross-sectional area of the slab.

For making a welding as illustrated in FIGS. 5A to 5I, it is not necessary to use the electron beam welding nor the flash butt welding which requires a large capacity of power source, but high-pulse TIG welding now under development may be used satisfactorily. Table 2 shows the performance of the high-pulse TIG welding in comparison with that of the electron beam welding.

It is also possible to use conventionally adopted large-current TIG welding, or submerged welding which has also been adopted conventionally depending on the weld depth.

TABLE 2

| welding method items | electron beam welding | high-pulse TIG welding |
|---|---|---|
| maximum weldable thickness by one pass | 150 mm | 30 mm |
| weld speed | 200 mm/min. at 100 mm thick | 200 mm/min. at 20 mm thick |
| installation cost | high | moderate |

As a modification, it is possible to weld the slab by the flash butt welding, while the slabs are still in the heating furnace or immediately after the slabs have left the heating furnace. By so doing, it is possible to reduce the capacity of the power source for the flash butt welder, because the heated slabs exhibit a higher electric resistance than that at ordinary temperature.

Also, it is to be noted that the welding need not always be made at both sides of the slabs. For instance, the slabs may be welded only at their upper side, lower side or even at lateral sides. Namely, all that is required for the welding is to provide a sufficient strength to avoid the separation of the welded slabs during the rolling.

After the welding, the continuous strip of slabs connected by welding in series is fed into the heating furnace and heated continuously, and is then delivered to the planetary mill 24 through the edger 21, and feed rolls 22, 23. Finally, the continuous strip is rolled by the planishing mill 26 and then coiled by the coiler 29. The positions of the weld parts of the strip are detected through a tracking employing a HMD (Hot Metal Detector). The dividing shear 27 is actuated to sever the preceding and succeeding slabs at the detected weld parts.

Thanks to this jointing of plurality of slabs in series, the undesirable vibration and noise during rolling by the planetary mill 24 is very much suppressed and the delivery of the leading end of the strip by the planetary mill 24 to the planishing mill 26 is much facilitated.

Also, since the welding is effected only at the surface portions of the slabs, the welding can be completed in a shorter time and, in addition, the pretreatment of the leading and trailing ends of the slabs is facilitated considerably, as compared with the case of welding over the entire cross-section of the slabs.

FIG. 6 shows another embodiment of the invention applied to a full-continuous hot strip mill.

The slabs coming from a slab yard 18 are welded as they pass a front table 19 and then reheated in a tunnel furnace 20, as in the case of the planetary mill. The slabs connected in series by welding are subjected to a descaling treatment which is effected by a scale breaker 3. Subsequently, the slabs are delivered to Nos. 1 to 4 roughing mills 4–7 to be roughly rolled and finally delivered through a Table 8 to Nos. 1 to 6 finishing mills 10–15 so as to be finished.

As stated before, the conventional technique in which the slabs are not connected in series requires a crop shear disposed between the roughing mill and the finishing mill.

The finished strip is then delivered through a hot run table 28 to the coiler 29 so as to be coiled by the latter, as in the case of the rolling line shown in FIG. 1. If it is required to divide the strips into sections, the strip is sheared into sections by a dividing shear disposed at the upstream side of the coiler and the severed sections are coiled into separate coils.

According to this embodiment, the generation of fish tails is prevented by the connection of slabs in series by welding, so that the reduction of yield due to the cropping treatment is fairly avoided. It is also to be pointed out that the production efficiency is improved because the rolling can be made at the ordinary high speed even in the transient period in which the leading end of the strip is moved from the finishing mill to the coiler.

From the foregoing description, it will be apparent that the cropping treatment, which has to be done in the prior art for leading and trailing ends of each slab, is required only for the leading and the trailing end of a continuous line of a plurality of slabs connected in series by welding. As a result, the yield of the product is improved by at least 1%.

Further, it is to be noted that the invention permits a full continuous rolling without incurring the reduction of the production efficiency because the connection of the slabs can be achieved by a comparatively simple and easy welding.

The described embodiments are basic forms of the method of and apparatus for continuously rolling slabs in accordance with the invention, and achieve the characteristic features of the invention. These embodiments, however, are not exclusive and various changes and modifications may be imparted thereto. For instance, it is possible to modify the described embodiment to include means for aligning the slabs with each other before they are welded, as a part of the rolling process.

A description will be made hereinunder as to modifications of the described embodiments. The improvement mainly resides in the additional provision of means for centering the slabs before the welding and means for locating the slabs before the welding, as well as methods of operating these means. As a result of these modifications, the driving system for the carriage has been partly changed and modified.

Referring to FIGS. 7 and 8, a front table 53 carrying a large number of slab transferring rollers 54 is mounted on a base 52. The separate slabs to be welded are successively transferred in the direction of arrow A along the table.

On the other hand, a rear table 59 constituted by a large number of slab transferring rollers 60 is mounted on a base 58 disposed at the rear side (left side as viewed in FIGS. 7 and 8) of the line. Between the front and rear tables 53 and 59, there is disposed a weld carriage 62 capable of reciprocatingly running in the direction A of movement of the slabs. The carriage 62 is mounted on rails 66 through the medium of wheels 64, and is adapted to be moved at suitable speeds back and forth as the wheels are driven.

The carriage 62 has an inlet side table 69 and an outlet side table 71. The inlet side table includes a suitable number of conveyor rollers 68. In the illustrated modification of the embodiment, 8 rollers are used, 4 at left side and 4 at right side. The outlet side table 71 includes a suitable number of conveyor rollers 70. A welder 72 and a stopper 74 are disposed between the inlet and outlet side tables 69 and 71. These rollers 68 and 70 are adapted to be driven and controlled independently.

The stopper 74 is adapted to locate the preceding and suceeding slabs at the welding position, and is disposed vertically movably to and from the path of the slabs.

Side guides 78 operatively connected to a centering device 76 are disposed at respective sides of the inlet side table 69. Also, rods 80 for detecting the perpendicularity at the inlet side are disposed at the rear end of the inlet side table. The rods 80 are adapted to detect the perpendicularity of the leading end surface of the succeeding slab on the inlet side table, i.e. the closeness of the contact of that leading end surface to the stopper 74. Means are provided for finely adjusting the angle of the slab in accordance with the result of detection of the perpendicularity, to keep the succeeding slab in close contact with the stopper 74. Similarly, outlet side perpendicularity detecting rods 82 are disposed in the vicinity of the outlet side table 71, and are adapted to detect the perpendicularity of the trailing end surface of the preceding slab on the outlet side table. Means are also provided for adjusting the angle of the preceding slab in accordance with the result of the detection of the perpendicularity, to obtain the perpendicularity of the preceding slab. The perpendicularity of the slabs is strictly required for making a correct and precise welding at the opposing ends of the preceding and succeeding slabs.

The carriage 62 further carries a clamp device 84 which is adapted to clamp in the widthwise direction the preceding slab which has been positioned by the cooperation of the stopper 74 and the rods 80, 82 for detecting the perpendicularity, and to fix the same to the carriage 62.

In FIGS. 7 and 8, a reference numeral 86 denotes a swing roller, while reference numerals 88 and 90 denote clutches which are provided in the driving power transmission mechanisms for the inlet and outlet side tables 69 and 71, respectively.

In operation, the speed of conveying the slabs on the front table 53, the speed of conveying the slab on the rear table 59, forward and backward movements of the carriage 62, and the timing of driving and conveying speeds of the slabs on the inlet side and outlet tables 69, 71 are controlled in a timed relationship to one another to permit successive weldings of the slabs on the carriage.

Figure 10:
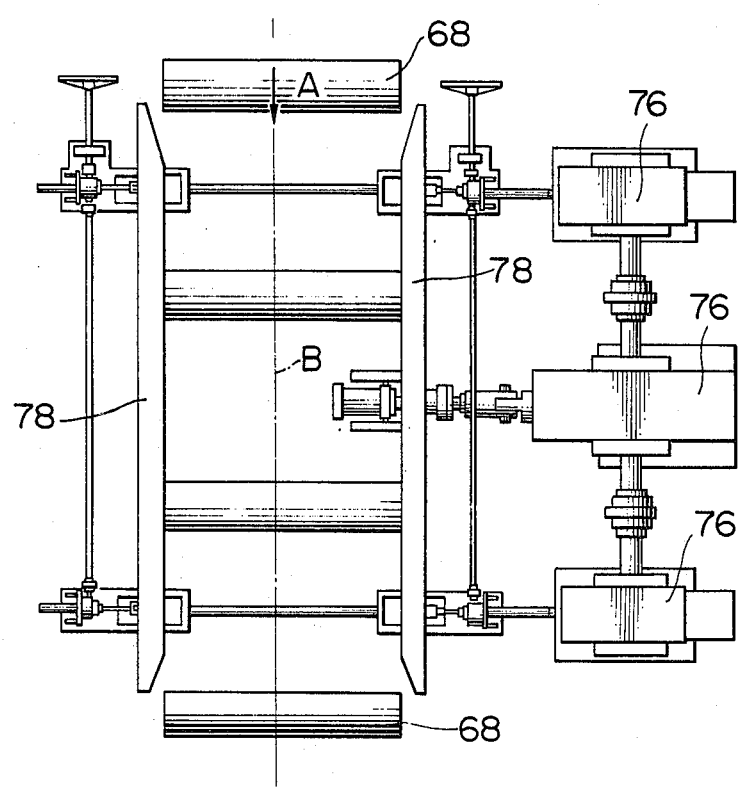
FIG. 10 is an enlarged plan view of a centering device and a side guide.

FIG. 10 illustrates the constructions of the aforementioned centering device 76 mounted on the weld carriage and the aforementioned side guides 78 operatively connected to the centering device 76. The slabs which are fed into the inlet side table on rollers 68 in the direction of the arrow A are guided to assume the position which is precisely centered to the inlet side table 69, as the positions of the side guides are controlled in symmetry with respect to the widthwise bisector line B of the rollers 68 and in accordance with the width of the slabs.

Figure 11:
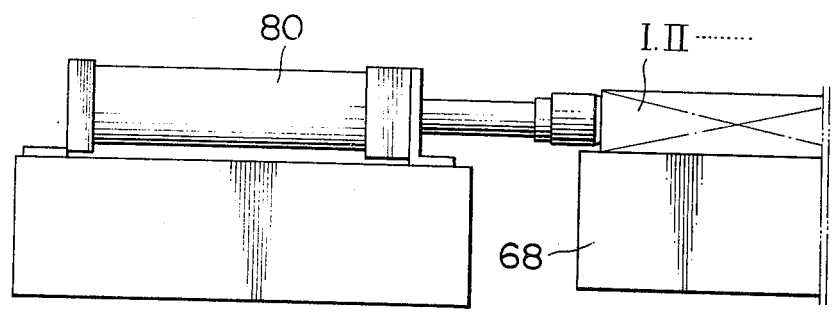
FIG. 11 is an enlarged partial front elevational view of a rod for detecting the perpendicularity at the inlet side.

Referring now to FIG. 11 showing an example of the construction of the rod 80 for detecting the perpendicularity of the slab at the inlet side, the rod 80 is disposed at each side of the inlet side table 69. These rods are actuated when there is a gap between the leading end surface (welding position) of the slab on this table and the stopper 74 or the trailing end surface of the preceding slab, upon detect of such a gap, to finely control the position of the slab for achiving the close contact of the leading end surface of the succeeding slab with the stopper 74 or the trailing end surface of the preceding slab. The outlet side perpendicularity detecting rods 82 have materially the same construction as the rods 80 for the inlet side and are disposed at respective sides of the outlet side table 71. These rods 82 are adapted make a fine control of the slab on this table 71 to precisely locate the welding position.

Figure 12:
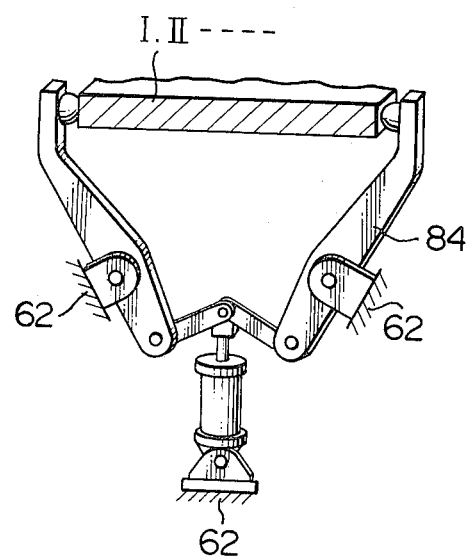
FIG. 12 is a front elevational view of a clamping device.

FIG. 12 shows an example of the construction of the aforementioned clamp device 84. The clamp device 84 has clamp arms adapted to be actuated by means of hydraulic cylinders so as to clamp the slab on the outlet side table in the widthwise direction, thereby to fix the same to the welding position on the carriage.

The operation of this modification will be described hereinunder with reference to FIG. 7 and also to FIGS. 9A to 9E.

A first slab I is fed at a speed to $V+\alpha$ (400 mm/sec.) onto the inlet side table 68 mounted on the weld carriage 62, by means of the front table rollers 54 and is made to stop there. The slab I is centered by means of the side guides 78 which are controlled by the centering device 76.

The first slab I or successive slabs have a length of, for example, 4000 to 74000 mm, and a width of 600 to 1600 mm. The slabs can have various thicknesses. For instance, it is possible assume a thickness of 100 to 200 mm. In the specification, the numerical data are recited as examples to show the data as observed in rolling of the slabs having a size falling within the above specified range.

The side guides 78 are opened, i.e. moved away from each other, after the centering of the slab I. Subsequently, the inlet and outlet side table rollers 68 and 70 are driven to transfer the slab I at the speed of $V+\alpha$. After the trailing end surface of the slab I has passed the welding point X, the inlet side and outlet side table rollers 68, 70 are stopped to stop the slab. In the illustrated case, the driving of the rollers is stopped. In this state, the stopper 74 annexed to the weld carriage 62 is raised to the level of the path of the slab, and the outlet side table rollers 70 are reversed to move the slab I backward at a speed of V+α until the rear end surface of the slab I is brought into contact with the stopper 74.

Figure 9A:
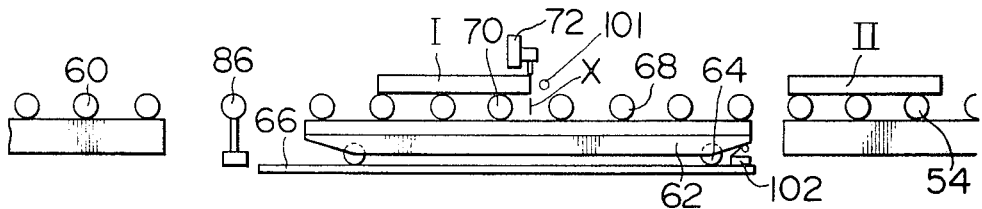
FIGS. 9A to 9E are illustrations of the continuous welding apparatus in respective steps of operation.

The contact surface of the stopper 74 is usually kept in parallel with the line of welding to be performed by the welder 72. A fine adjustment is made as required to put the trailing end surface of the slab I into close contact with the contact surface of the stopper 74, by means of the outlet side perpendicularity detecting rods 82, thereby to precisely locating the trailing end surface of the slab at the welding position. After confirming the close contact of the trailing end surface of the slab, i.e. that the trailing end surface of the slab is kept in parallel with the line of welding, the slab I is clamped in the widthwise direction by means of the clamp device 84 which is mounted on the weld carriage 62. This clamp device 84 is intended for holding the trailing end of the slab I at the welding position X and to unitarize the slab I with the carriage. The stopper 74 is then lowered below the level of the path of the slab, after the slab I has been clamped. Meanwhile, the succeeding or second slab II has been transferred along the front table 53 to the rear end of the latter. FIG. 9A shows the first and the second slabs in this state.

Subsequently, the second slab II which has reached the end of the front table 53 is fed onto the inlet side table rollers 68 on the carriage 62 at a speed of V+α (400 mm/sec.) as in the case of the first slab I and is made to stop there. The second slab II is centered while it stays on the inlet side table rollers 68, by means of the centering device 76 and the side guides 78.

After the completion of the centering, the side guides 78 are opened and the inlet side table rollers 68 are driven to transfer the slab II at the speed of V+α. Then, as the second slab approaches the trailing end surface of the preceding first slab I, the speed of the second slab is reduced from V+α to Vo, and the leading end surface of the second slab II is bought into contact with the trailing end surface of the first slab I. In case that an excessively large gap is left between these surfaces, the posture of the second slab II is finely adjusted by means of the inlet side perpendicularity detecting rods 80 to obtain a close contact between the leading end surface of the second slab and the trailing end surface of the first slab I. The slabs I and II thus located at the welding position are then welded to each other by means of the welder 72.

The portions of the abutting surfaces of the slabs are previously determined to provide a weld area which is large enough to exclude breakage or separation of the strip after the rolling, and is memorized in a controller having a memory device. It is therefore possible to detect the completion of welding by sensing the position of the welding head by means of a PLG, which is a pulse generator not shown and adapted to detect the position of the welding head, and then comparing the sensed position with the previously set head position. This measure can equally be adopted in the first embodiment shown in FIG. 1.

After the completion of the welding of the first and the second slabs I and II to each other, the clamp device 84 which has clamped the slab I is opened and the inlet side and outlet side table rollers 68, 70 are driven to convey the slabs I and II at a speed (30 mm/sec.). As the trailing end surface of the slab II has passed the welding position X, the inlet and outlet side table rollers 68 and 70 are stopped to stop the conveying of the slabs I and II.

Figure 9B:
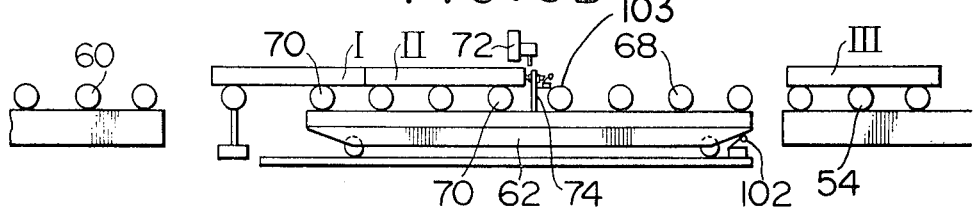

Subsequently, the stopper 74 of the weld carriage 62 is raised again to the level of path of the slabs. This state of the rolling line is shown at FIG. 9B. In this state, the slab I still stays on the swing roller 86, while, on the front table rollers 54, a subsequent slab III has approached the end of the latter.

After the rise of the stopper 74, the wheels 64 of the weld carriage are driven by means of the motor so that the carriage is moved to the left as viewed in the drawings at a speed V+α (400 mm/sec.) along the rails 66. The stopper 74 is moved accordingly toward the trailing side end of the slab II, the moving speed of the carriage 64 is decreased from V+α to Vo (100 mm/sec.) as the latter is approached by the stopper 74. After the stopper 74 has been brought into contact with the slab II, the weld carriage 62 is stopped. If the contact is made incompletely to permit an excessively large clearance between the stopper 74 and the trailing end surface of the slab II, the postures of the slabs I and II are finely adjusted by means of the outlet side perpendicularity detecting rods 82 to put the trailing end surface of the second slab II in parallel with the contact surface of the stopper 74. The clamp device 84 is then actuated again to clamp and fix the first and second slabs I and II in this posture. After the clamping, the stopper 74 is lowered again.

Then, the subsequent slab III which has reached the end of the front table 53 is transferred and controlled in the same manner as the second slab II and is stopped as it makes contact with the trailing end surface of the slab II. Also, the fine adjustment of the posture of the third slab III is effected as required by means of the inlet side perpendicularity adjusting rods 80.

Then, the slab III is welded to the preceding slab II by means of the welder 72. After the completion of the welding, the clamp device 84 is opened and the inlet and outlet side table rollers 68, 70, as well as the rear table rollers 60, are started to transfer the three slabs I, II and III which are now integral as a result of the welding, at a speed α (30 mm/sec.).

Then, as the trailing side end of the slab III has passed the welding position X, the stopper 74 is raised and the wheels 64 of the weld carriage 62 are driven to move the weld carriage 62 to the left at the speed of V+α (400 mm/sec.) along the rails 66. As a result, the stopper 74 on the carriage is moved toward the trailing end of the slab III.

After the stopper 74 has been moved to a position close to the slab III, the moving speed of the carriage 62 is reduced from V+α to Vo (100 mm/sec.), and the contact surface of the stopper is put into contact with the trailing side end of the slab III. After this contact, the carriage 62 is stopped and the clamp device 84 is actuated to clamp the slab III to fix the same to the carriage, thereby to locate the trailing end of the slab III at the welding position.

Figure 9C:
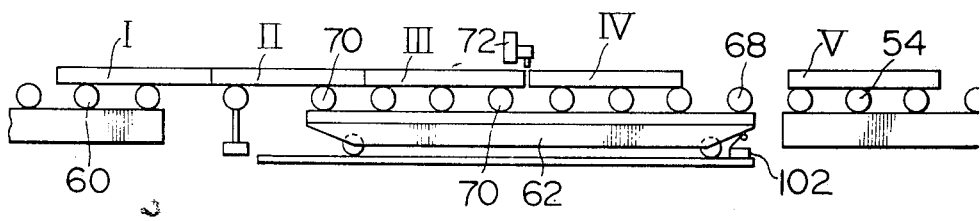
Figure 9D:
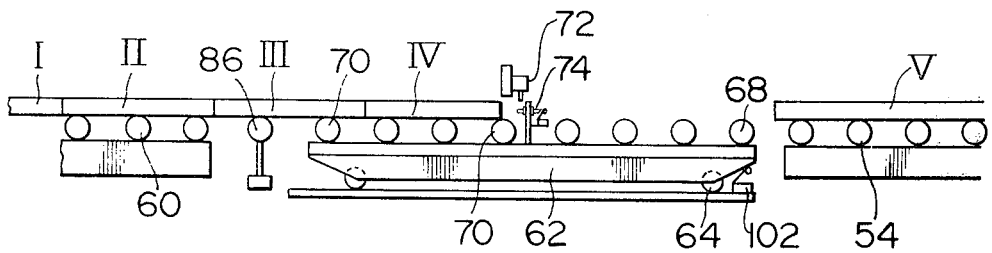
Figure 9E:
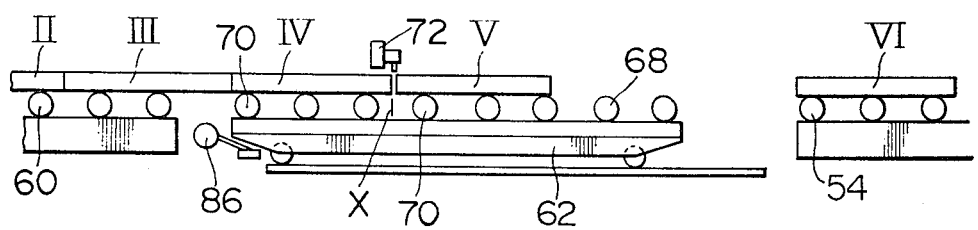

Meanwhile, the subsequent slab IV has moved on the front table rollers 54 and has reached the end of the latter. This slab IV is then fed onto the inlet side table rollers 68 on the carriage 62 in the same manner as the second and third slabs II, III and is brought into contact with the trailing side end surface of the preceding slab III after a centering. The slab IV is then welded to the slab III by the welder 72. FIG. 9C shows the step of this welding.

After the welding of the slab IV to the preceding slab III, the clamp device 84 is opened and the rear table rollers 60 are driven to transfer the slabs I, II, III and IV which are now unitary as a result of the welding, at a speed of α (30 mm/sec.). During the transfer of these slabs, the clutches 88 and 90 of the driving systems for the inlet and outlet side table rollers 68, 70 are disengaged to permit the rollers of respective tables to rotate freely. Then, the wheels 64 of the carriage 62 are reversed to drive the latter toward the front table 53 at a speed of V+β (600 mm/sec.) along the rails 66.

The arrival of the carriage 62 at the end portion of the front table 53 is detected by a limit switch 102 which is adapted to transmit a signal for stopping the carriage.

Subsequently, the front table rollers 54 and the inlet side table rollers 68 on the carriage are actuated to feed the subsequent slab V onto the inlet side table rollers 68.

On the other hand, the passage of the trailing side end of the welded slab is detected by means of a CMD (Cold Metal Detector such as a photo cell consisting of a light emitting element 100 and a light receiving element 101 as shown in FIGS. 7 and 9A), and, after lapse of a predetermined time from the detection, the wheels 64 of the weld carriage 62 are driven to move the latter again toward the trailing side end of the preceding slab IV, i.e. to the left as viewed in the drawings, at the speed of V+α (400 mm/sec.).

Simultaneously with the start of the carriage 62, the stopper 74 is raised and moved toward the trailing side end of the preceding slab IV which is being conveyed at the speed of α (30 mm/sec.).

Thus, the stopper 74 runs at the speed of V+α after the preceding slab IV which is moving at the speed of α, and comes into contact with the latter. As this contact is made, the speed of the weld carriage is reduced from V+α to α, and the stopper 74 is lowered. When the speed of the carriage 62 has decreased to the same speed α as those of the preceding slabs I, II, III and IV, the clamp device 84 is actuated to clamp the slab IV. The timings of lowering of the stopper 74 and the actuation of the clamp device 84 are determined by a limit switch 103.

The slab V which has been fed onto the inlet side table rollers 68 is centered by means of side guides 78 which are under the control of the centering device 76. During the centering operation, the inlet side table rollers 68 are not driven. After the completion of the centering, the inlet side table rollers 68 are started again to bring the slab V into contact with the trailing side end of the slab IV at a speed of V+α. This contact can be detected by the CMD 100, 101 and by means of a timer. Then, the inlet side perpendicularity detecting rods 80 are actuated as required to finely adjust the posture of the slab V to precisely set the latter at the welding position.

After confirming that the slab V has been set for the welding, the driving of the inlet side table rollers 68 is stopped and the welding is effected by the welder 72. Then, the clamp device 84 is opened and the inlet and outlet side table rollers 68, 70 are freed by disengagement of the clutches 88, 90. In this state, the slabs I, II, III, IV and V which have been welded together are conveyed at the speed of α (30 mm/sec.). The weld carriage 62 is kept free from these slabs in this state. Then, the driving wheels 64 of the weld carriage are reversed to move the carriage at a speed of V+β (600 mm/sec.) toward the front table 53. After the arrival of the weld carriage 62 at the front table, the subsequent slab VI is moved onto the inlet side table 69 of the carriage. Thereafter, as in the case of the slab V, the slab VI is positioned and welded. The described operation is cyclically repeated to weld successive slabs into series. It is therefore possible to weld separate materials continuously.

The slabs which have been welded together and carried by the rear table 60 are moved continuously at a constant speed of α (30 mm/sec.), while the succeeding slabs coming from the front table 54 are successively welded by the controlled operation of the weld carriage 62. The welding is made on the carriage 62 while moving the latter in the same speed and the same direction as the preceding slabs.

Therefore, when the slabs welded together are fed into the rolling mill, the transfer speed of the slabs can be completely synchronized with the rolling speed, so that the rolling is rendered more smooth to reduce the rolling load.

As will be also understood from the foregoing description, according to the invention, slabs are successively welded in series by means of a welder which is carried by a carriage adapted to be moved in a timed relation to the transfer of the slabs, while the carriage is being moved in synchronization with the transfer of the slabs. It is therefore possible to continuously weld the slabs without stopping the flow of the slabs.

Although the invention has been described through specific embodiments and modification, needless to say, these embodiments and modification are not exclusive, and various other changes and further modifications are possible without departing from the scope of the invention which is limited solely by the appended claims.

What is claimed is:

1. In a process for producing strip by a continuous hot rolling of slab steel including the steps of welding a piece of slab at its leading end to the trailing end of a steel slab while transferring said steel slab by making said piece of slab follow said steel slab, moving said steel slab including successive steel slab pieces welded together in series through a heating furnace to heat said steel slab, and effecting hot rolling of a steel slab by passing said steel slab through a rolling mill to produce a strip;

wherein the improvement resides in that said step of welding is made at the boundary surface between the trailing end of said steel slab and said piece of slab which is positioned in abutment at its leading end with said trailing end of said steel slab, over an area which amounts to 1/20 to ½ of the whole area of said boundary surface, and in the further step of shearing said roller strip at said areas of welding after said step of hot rolling.

2. A process as claimed in claim 1, wherein said welding is made along at least a portion of the boundary surface by directing a welder from at least one of upper, lower and lateral sides of the abutting surfaces of said steel slab and said piece of slab toward said abutting surfaces, whereby the weld is spread from the surface portion of said slabs toward the inner side of said slabs.

3. A process as claimed in claim 1, wherein the welding step is achieved by effecting a flash butt welding on the abutting surfaces of said steel slab and said piece of steel slab.

4. A process as claimed in claim 1, wherein said step of welding includes the step of bringing the trailing end surface of said steel slab and the leading end surface of said piece of slab into contact with each other before the welding.

5. A process as claimed in claim 1, 2, 3 or 4, wherein said step of welding includes the steps of holding said steel slab and said piece of steel slab in abutment with each other until the welding is completed.

6. An apparatus for producing a strip by a hot rolling process including the steps of welding a piece of slab at its leading end to the trailing end of a steel slab while transferring said steel slab by making said piece of slab follow said steel slab, moving said steel slab including successive steel slab pieces welded together in series through a heating furnace to heat said steel slab, and effecting a hot rolling of said steel slab by passing said steel slab through a rolling mill, characterized by comprising: a first transfer passage means for delivering pieces of steel slab; a second transfer passage means for moving said steel slab through a hot rolling mill continuously; rails disposed ahead of said first transfer passage means and extending forwardly with respect to the moving direction; carriage means to receive said pieces of steel slab delivered from said first transfer passage means and to move on said rails from said first transfer passage means to said second transfer passage means, at the same speed as said moving steel slab while keeping the leading end of said piece of steel slab in abutment with the trailing end of said steel slab; welder means mounted on said carriage for welding the piece of steel slab on said carriage to said steel slab, and provided with means for driving said welder in the direction parallel to the joint line between abuting ends of said steel slab and said piece of steel slab during said welding; and means for shearing said steel slab at the welded joint line after it has passed through the hot rolling mill.

7. An apparatus as claimed in claim 6, wherein said carriage means includes wheels by means of which said carriage means runs along said rails, means for fixing the trailing end of said steel slab to said carriage means, and means for fixing said piece of steel slab to said carriage means with the leading end of said piece of steel slab kept in abutment with the trailing end of said steel slab.

8. An apparatus for continuously rolling slab steel comprising:
a serial linear arrangement of a front table, a carriage having an inlet table and an outlet table, a rear table, and a rolling mill;
said front table having a plurality of rollers rotatably mounted in a common plane for supporting pieces of steel slab, and at least one of said rollers including power means for selectively driving it to feed said pieces of steel slab in a path parallel to said linear arrangement to said carriage;
said rear table having a plurality of rollers arranged in said common plane for supporting a continuous strip of slab steel during its movement along said path and into said rolling mill;
said carriage having a length along said path that is substantially less than the distance between adjacent ends of said front table and said rear table, and said carriage being mounted for reciprocating movement along said path from closely adjacent said front table to closely adjacent said rear table;
said inlet table of said carriage having a plurality of rolles arranged in said common plane for supporting pieces of steel slab, fed from said front table, and at least one of its rollers including power means for selectively driving it;
said outlet table of said carriage having a plurality of rollers arranged in said common plane for supporting said continuous strip of slab steel;
control means for actuating said power means of said front table and said power means of said inlet table of said carriage to advance successive pieces of steel slab at a speed greater than the speed of the moving strip to abut each piece of steel slab, successively, with the trailing edge of said strip when said carriage is closely adjacent said front table;
said carriage having mounted thereon means butt welding the leading edge of a piece of steel slab on said inlet table to the trailing edge of said continuous strip of slab steel on said outlet table; and
means for driving said carriage from closely adjacent said front table toward said rear table at the same speed as said strip of slab steel during operation of said welding means; and
means for thereafter returning said carriage to closely adjacent said front table.

9. The apparatus of claim 8, including at least one support having a support roller and being movably mounted between an operative position wherein its roller is in said common plane substantially midway between said rear table and the adjacent end of said carriage when said carriage is closely adjacent said front table, and an inoperative position permitting free passage of said carriage past said support, and including drive means for moving said support between its two positions.

10. The apparatus of claims 8 or 9, wherein said carriage further includes means for sensing the location of the trailing edge of said strip and producing a corresponding trailing edge location signal;
said carriage including a reference stopper plate movable between an operative position in said common plane between the trailing edge of said strip and the next one of said pieces of steel slab and perpendicular to the moving direction, and an inoperative position substantially spaced from said common plane; and
said carriage further having means moving said stopper plane from its inoperative position to its operative position in response to said strip trailing edge locating signal;
said carriage further having mounted thereon means for determining parallelism between said stopper plate and the adjacent edge of the next piece of steel slab and producing a differential signal; and
means responsive to said differential signal for rotating said next piece of steel slab about a vertical axis to correct for any unparallelism between the leading edge of said next piece of steel slab and said stopper plate.

11. The apparatus of claim 10, including means for measuring parallelism between the trailing edge of said strip and said stopper plate and producing a second differential signal correlated to the unparallelism; and
said means for rotating being further responsive to said second differential signal.

12. The apparatus of claim 11, including centering means for centering the longitudinal axis of each piece of steel slab while on said inlet table with the longitudinal axis of the strip prior to the same piece of steel slab being rotated by said means for rotating.

13. The apparatus of claim 10, including centering means for centering the longitudinal axis of each piece of steel slab while on said inlet table with the longitudinal axis of the strip prior to the same piece of steel slab being rotated by said means for rotating.

* * * * *